US008934008B2

(12) United States Patent
Rudin et al.

(10) Patent No.: US 8,934,008 B2
(45) Date of Patent: Jan. 13, 2015

(54) SYSTEM AND METHOD FOR DETERMINING GEO-LOCATION(S) IN IMAGES

(75) Inventors: Leonid I. Rudin, San Marino, CA (US); Ping Yu, Castaic, CA (US)

(73) Assignee: Cognitech, Inc., Pasadena, CA (US)

(*) Notice: Subject to any disclaimer, the term of this patent is extended or adjusted under 35 U.S.C. 154(b) by 733 days.

(21) Appl. No.: 12/683,185

(22) Filed: Jan. 6, 2010

(65) Prior Publication Data
US 2011/0169946 A1 Jul. 14, 2011

Related U.S. Application Data

(60) Provisional application No. 61/267,243, filed on Dec. 7, 2009.

(51) Int. Cl.
| H04N 7/18 | (2006.01) |
| G01S 5/16 | (2006.01) |
| G01S 19/51 | (2010.01) |

(52) U.S. Cl.
CPC ... *G01S 5/16* (2013.01); *G01S 19/51* (2013.01)
USPC ...................................................... 348/135

(58) Field of Classification Search
USPC ...................................................... 348/135
See application file for complete search history.

(56) References Cited

U.S. PATENT DOCUMENTS

| 4,713,533 | A | * | 12/1987 | Bremer et al. | ............. | 250/203.1 |
| 5,568,152 | A | | 10/1996 | Janky et al. | | |
| 6,281,970 | B1 | * | 8/2001 | Williams et al. | ........... | 356/141.4 |
| 6,614,429 | B1 | * | 9/2003 | Zhang et al. | .................. | 345/420 |
| 2003/0063133 | A1 | * | 4/2003 | Foote et al. | .................... | 345/850 |
| 2003/0210329 | A1 | * | 11/2003 | Aagaard et al. | ............... | 348/159 |
| 2006/0023090 | A1 | * | 2/2006 | Takata et al. | .................. | 348/239 |
| 2006/0094955 | A1 | * | 5/2006 | Satoh et al. | .................... | 600/426 |
| 2007/0043504 | A1 | | 2/2007 | Dorfman et al. | | |
| 2007/0100542 | A1 | * | 5/2007 | Courtney et al. | ............. | 701/208 |
| 2008/0219654 | A1 | * | 9/2008 | Border et al. | .................... | 396/89 |
| 2008/0281509 | A1 | | 11/2008 | Hsieh et al. | | |
| 2008/0297366 | A1 | | 12/2008 | Hsieh et al. | | |
| 2008/0319664 | A1 | * | 12/2008 | Kremin et al. | ................. | 701/213 |
| 2009/0136211 | A1 | * | 5/2009 | Kikukawa et al. | ............ | 386/117 |
| 2010/0231721 | A1 | * | 9/2010 | Meloche et al. | ............... | 348/159 |

OTHER PUBLICATIONS

International Search Report on corresponding PCT application (PCT/US2010/059332) from International Searching Authority (KIPO) dated Aug. 31, 2011.
Written Opinion on corresponding PCT application (PCT/US2010/059332) from International Searching Authority (KIPO) dated Aug. 31, 2011.

* cited by examiner

*Primary Examiner* — Sath V Perungavoor
*Assistant Examiner* — Jeffery Williams
(74) *Attorney, Agent, or Firm* — Klein, O'Neill & Singh, LLP

(57) ABSTRACT

Determining GPS coordinates of some image point(s) positions in at least two images using a processor configured by program instructions. Receiving position information of some of the positions where an image capture device captured an image. Determining geometry by triangulating various registration objects in the images. Determining GPS coordinates of the image point(s) positions in at least one of the images. Saving GPS coordinates to memory. This system and method may be used to determine GPS coordinates of objects in an image.

4 Claims, 7 Drawing Sheets

SYSTEM AND METHOD FOR DETERMINING GEO-LOCATION(S) IN IMAGES

CROSS-REFERENCE TO RELATED APPLICATION(S)

This application claims the benefit of U.S. Provisional Patent Application No. 61/267,243 filed Dec. 7, 2009, the disclosure of which is incorporated by reference herein.

BACKGROUND OF THE INVENTION

The present invention relates generally to position determination, and more particularly determining the position, location or coordinates of objects, or points in an image with respect to a coordinate system other than the local coordinate system of the image itself.

Determining the position of various objects in an image is useful for understanding the distance between objects or possibly the absolute distance between an object and another object that may not be in the image. Positions of objects in an image are usually determined by taking a photograph of an area. In the photograph there is usually a reference object whose position is known. The position of the other objects in the image is determined by computing the distance away from the reference object with the known position. The reference object with the known position enables the other objects to have known positions within the coordinate system of the photograph as well as a coordinate system that may be outside of the photograph.

Another way of determining the approximate positions of objects is simply by GPS image tagging. A GPS enabled camera may be utilized to take photographs. Each photograph may be tagged with the GPS information of the location of the camera when the photograph is taken. The GPS information can be associated with the captured image via a time stamp of both the GPS information and the image or the UPS image can simply be embedded in the digital data of the photograph. Unfortunately, GPS tagging only records the position of the camera when the photograph was captured. The GPS positions of objects in the photograph are still unknown.

Another method of determining positions of objects is through surveying. Surveyors use optical instruments to locate and/or triangulate positions on the ground. For example, a surveyor may be required to survey the boundaries of a property. Usually, the surveyor will find the nearest monument that has a known position. In this example, the monument may be several blocks from the property that may be required to survey. Once a monument is located, the surveyor uses optics and a human eye to physically measure distances from the monument. Unfortunately, surveying is prone to errors such as optical errors and human eye errors. Also, the surveying method only determines the position of a single point at a time with a great deal of effort.

Unfortunately, many of the systems and methods described above have problems. The position of an object may still be required even when there are no positions of reference objects available. Multiple points may need to be determined simultaneously. Accuracy, greater than the errors inherent in the human eye and optics may be required.

BRIEF SUMMARY OF THE INVENTION

The present invention relates generally to position determination, and more particularly determining the position, location or coordinates of objects, or points in an image with respect to a coordinate system other than the local coordinate system of the image itself.

Position determination may be implemented in a general purpose computer or an embedded system, for example a digital camera, cellular handset, GPS receiver, or any combination of these devices. In one embodiment the invention may determine the GPS coordinates of each pixel in an image. The pixel coordinates may be determined first by performing image registration on three or more images to determine corresponding pixels. Receiving the GPS coordinates at each camera position where each of the three images were taken. Determining the rotations of the various camera coordinate systems with respect to the ECEF coordinate system or WGS84 coordinate system or other coordinate systems and translations of the camera coordinate system with respect to the ECEF coordinate system or WGS84 coordinate system or other coordinate systems optical. Determining the GPS coordinates of each pixel in the image using the rotation and translation information. And finally, saving the GPS coordinates into a memory. In some embodiments the GPS coordinates of each pixel are determined with three or more images. In other embodiments, the GPS coordinates of each pixel are determined with a single image and information from an Inertial Measurement Unit (IMU).

DETAILED DESCRIPTION

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
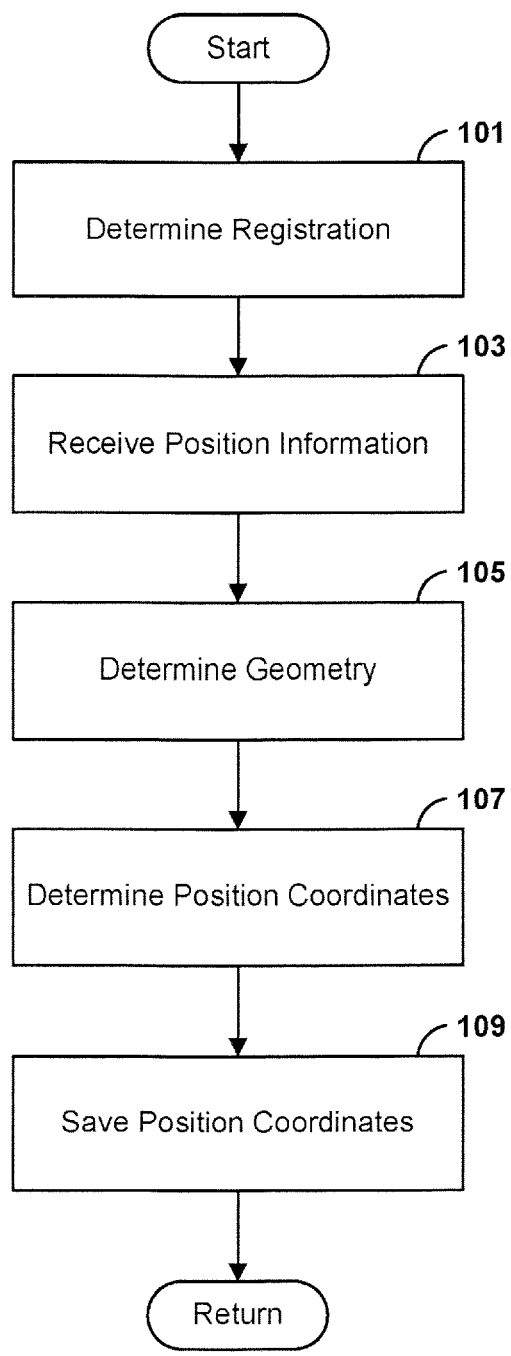
FIG. 1 is a block diagram of a method showing one aspect of the present invention, for determining position coordinates.

With reference to FIG. 1, in block 101 the process determines registration between three or more images. Registration determines the corresponding points, pixels, shapes, objects, lines, corners, neighborhoods, regions, projected images or any other type of registration object that can be depicted in an image or multiple images. In block 103 the process receives position information. In one embodiment, receiving position information comprises receiving the position information from each camera location where an image was taken. For example, a person with a camera with a built in GPS receiver may take three pictures of a single area or object from three separate locations. The GPS receiver tags each of the pictures or images with the GPS information from each location where the picture was taken. These GPS tags are received by the process. In other embodiments the position information may be a relative position (location) of a receiver with respect to transmission towers in a telecommunications system or in a radio frequency based system. In other embodiments receiving position information comprises receiving GPS coordinates that may be WGS84 or ECEF or derived from WGS84 or ECEF. In other embodiments, receiving position information comprises receiving a location in any positioning system. In block 105 the process determines the geometry. In one embodiment determining the geometry comprises using the position information to determine distances and angles between the various camera locations and corresponding registration objects in the images. In another embodiment determining the geometry comprises using the position information to determine the rotations and translations between various camera locations and corresponding shapes in the image. In another embodiment determining the geometry comprises triangulating various registration objects in the captured images of the various cameras. In another embodiment determining the geometry comprises determining the 3-D model associated with the distance to visible objects in the captured images. In block 107 the process determines the position coordinates. In one embodiment determining the position coordinates comprises determining the coordinates with respect to a coordinate system external from the camera coordinate system of various shapes in the picture or image. In block 109 the process saves the position coordinates. In one embodiment saving the position coordinates comprises saving position coordinates to a memory. Each of the blocks may be performed by the process in an order that is different than that which is depicted in FIG. 1. Additionally, each of the blocks may be optional in the overall process described in FIG. 1.

Figure 2:
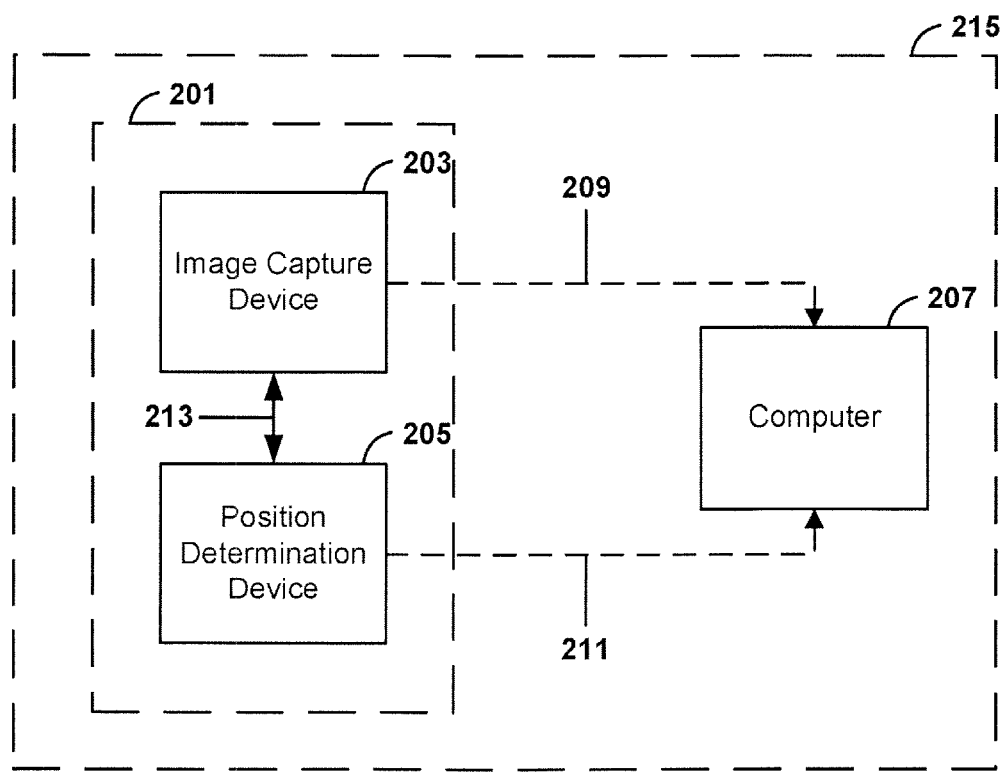
FIG. 2 is a block diagram showing one aspect of the present invention depicting a limited number of components constituting an exemplary system for implementing the present invention.

FIG. 2 depicts several components that may be used to implement the present invention. An image capture device 203 may be used in the present invention to capture images, pictures, photographs, JPEGs, Motion JPEGs, or video all referred to herein as images or image in the singular. A position determination device 205 may be used in the present invention to determine the current position of the image capture device 203 upon capturing an image. In one embodiment, a general purpose computer 207 in the form of a conventional personal computer may be used in the present invention to execute instructions. In other embodiments computer 207 may be a computer embedded in another type of system.

With reference to FIG. 2, 203 is an image capture device. In some embodiments, 203 is a digital camera that comprises an optical lens, memory that may be removable, controller for controlling the digital functions of the camera, and a communications port for transferring the digital images to another device or computer. In other embodiments, 203 may be a video camera that comprises an optical lens, storage for storing the captured video frames such as memory, tape, or optical disk, a controller for controlling the digital functions of the camera, and a communications port for transferring the video frames to another device or computer. In other embodiments 203 may be a cellular phone handset that comprises an optical lens, storage such as a memory for storing captured video frames or images, an embedded processor for controlling the functions of the cellular handset, a communications port for transferring the captured video frames or images to another device or computer. In each of the embodiments for 203 described above the storage element may be a memory that may be removable such as an SD card. Additionally, with reference to 203, the communications port described in the above embodiments may be wired such as a USB port or mini USB port or any other wired communication technology or it may be a wireless port such as Wi-Fi or Bluetooth or any other wireless communication technology. In some embodiments, image capture device 203 may be mounted on an aircraft, land or sea vehicle, helmet, clothing, linear mechanical stage, blimp, rotational stage, tripod, surveyor's tripod, rope, or any moving platform. 205 is a position determination device. In some embodiments 205 is a GPS receiver. In other embodiments 205 may be an IMU. In other embodiments 205 may be a laser radar or electromagnetic radar. In some embodiments 205 may be a local positioning system LPS receiver. In some embodiments the position determination device 205 and the image capture device 203 are combined into one device 201. 201 is indicated by a dashed line to indicate that in some embodiments the position determination device 205 and the image capture device 203 may be combined into one device 201. For example 201 may be a digital camera or cellular phone handset that has an on board GPS receiver or LPS receiver. In the embodiments where the image capture device 203 and the position determination device 205 are not combined then a communications capability may exist between the two devices 213. This communications capability may exist to synchronize the position information with each image or video frame. Sometimes the image capture device 203 and the position determination device 205 do not have a communications capability and the image or video frames are synchronized with clock or timing information after the data has been stored in each device separately. In this case where the image capture device 203 and the position determination device 205 do not have a communication capability with each other, each of these devices may be able to transfer its information to a computer 207 or similar device (i.e. other type of embedded system). 209 and 211 indicate that each device may be equipped with a communications port that may be used to transfer information. 209 and 211 may each be wired or wireless. In the embodiment where 209 and 211 are wired these connections do not have to be permanently connected to 207 but rather may be connected to 207 when information transfer is needed. Synchronization of the information between the image capture device 203 and the position determination device 207 may occur in computer 207. In some embodiments 207 is a general purpose computer equipped with a processor, memory, a display device, keyboard, input device, USB port, Ethernet card, optionally other wired or wireless communication ports, and instructions stored in memory and executed by the processor. In other embodiments 207 is an embedded system that includes a processor, memory, wired or wireless communications port, display and instructions stored in memory and executed by the processor. In some embodiment's image capture device 203, position determination device 205, and computer 207 may all be combined into one device 215. In one embodiment, 215 may be a digital camera with an on board GPS receiver and a processor capable of performing the processes described in the present invention. In some embodiments computer 207 may be a single chip such as an ASIC, FPGA, computing device, semiconductor device or microprocessor embedded in a device that is capable of performing the processes described in the present invention. A semiconductor device may comprise a single monolithic silicon type integrated circuit.

Figure 3:
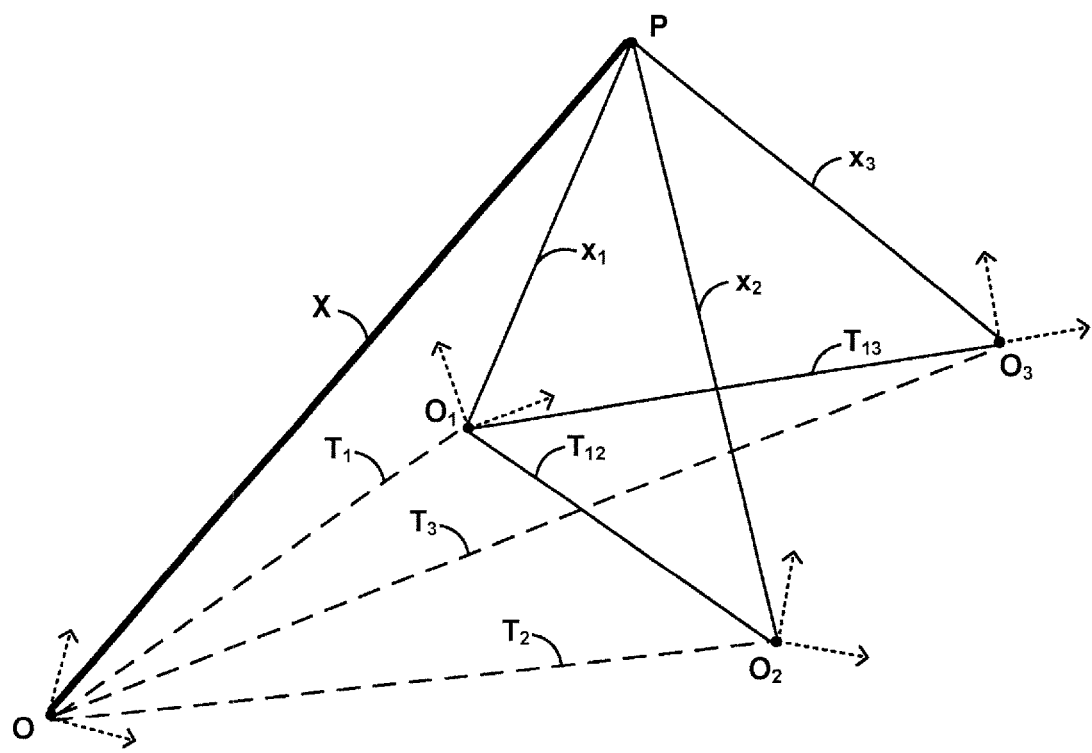
FIG. 3 is a diagram showing one aspect of the present invention depicting the geometry where at three separate positions image capture devices capture images that include point P.

FIG. 3 depicts an example where an image or multiple images are captured at three different positions $O_1$, $O_2$, and $O_3$. In some embodiments, Camera 1, Camera 2, and Camera 3 refers to cameras at positions $O_1$, $O_2$, and $O_3$ respectively. In other embodiments Camera 1, Camera 2, and Camera 3 refers to the same camera that may have moved to each of the locations $O_1$, $O_2$, and $O_3$. For example an aircraft or moving platform may be equipped with a camera and arrive at positions $O_1$, $O_2$, and $O_3$ and different times. In one embodiment these three positions are related to the optical centers of each of the cameras. In one embodiment each of the images captured includes the point in common P whose projection is in the image. Point P is a point in 3D space. Point P may also correspond to a point in the images. In one embodiment the corresponding image projections of the point P is determined through registration as discussed below. In other embodiments, point P may be a single point in either of the set of points $g_1, g_2, \ldots, g_n$, not indicated in FIG. 3. The projected point P in common is determined by using registration. The point set $g_1$ is a point set such that each point in the group can be viewed by camera 1, and the point has corresponding matching points in some other cameras in the group $g_1$. The point set $g_2$ is a point set such that each point in the group can be viewed by camera 2 but not camera 1, and it has corresponding matching points in some other cameras of the group $g_2$, and so on for other point groups. The point O is considered the origin or the center of the earth in Earth-Center, Earth-Fixed (ECEF) coordinates or also known as world coordinate system. The vector X is the position of point P in ECEF, GPS or WGS84 coordinates. The vector $x_1$ is the position of point P in the local coordinate system $O_1$. The vector $x_2$ is the position of point P in the local coordinate system $O_2$. The vector $x_3$ is the position of point P in the local coordinate system $O_3$. Local geometry refers to geometrical elements such as $x_1$, $x_2$, and $x_3$ described in local coordinate systems such as $O_1$, $O_2$, and $O_3$ respectively. $T_1$ is the vector translation from the point O to the point $O_1$ in the O coordinate system. $T_2$ is the vector translation from the point O to the point $O_1$ in the O coordinate system. $T_3$ is the vector translation from the point O to the point $O_3$ in the O coordinate system. Another way of describing $T_1$, $T_2$ and $T_3$ is simply that they are the ECEF coordinates of the three camera positions $O_1$, $O_2$, and $O_3$. $t_{12}$ is the vector translation in $O_1$ coordinates from the point $O_1$ to $O_2$. $t_{13}$ is the vector translation in $O_1$ coordinates from the point $O_1$ to $O_3$. The dotted lines at each of the points O, $O_1$, $O_2$, and $O_3$ depict local coordinate systems associated with each of these points. In some embodiments the x-y plane of the local coordinate systems for O, $O_1$, $O_2$, and $O_3$ may coincide with the image plane of the camera while the z axis is orthogonal to this plane. For example $x_1$ is the position of point P in the local coordinate system $O_1$. This may be different from $x_3$ because it is the position of the same point P but in a different coordinate system $O_3$. Each of these coordinate systems O, $O_1$, $O_2$, and $O_3$ may be rotated and translated into different orientations with respect to each other. In one aspect of the present invention we determine X from each of three images taken at known positions $O_1$, $O_2$, and $O_3$. Not indicated in FIG. 3 are the rotation matrices between each of the coordinate systems mentioned above with origins at O, $O_1$, $O_2$, and $O_3$. $R_1$ is the rotation from coordinate system O to coordinate system $O_1$. $R_2$ is the rotation from coordinate system O to coordinate system $O_2$. $R_3$ is the rotation from coordinate system O to coordinate system $O_3$. $R_{12}$ is the rotation from coordinate system $O_1$ to coordinate system $O_2$. $R_{13}$ is the rotation from coordinate system $O_1$ to coordinate system $O_3$. FIG. 3 satisfies the following geometric relationships:

$$x_1 = R_1(X - T_1) \quad [1]$$

$$x_2 = R_2(X - T_2) = R_{12}(x_1 + t_{12}) \quad [2]$$

$$x_3 = R_3(X - T_3) = R_{13}(x_1 + t_{13}) \quad [3]$$

$$R_2 = R_{12} R_1 \quad [4]$$

$$R_3 = R_{13} R_1 \quad [5]$$

$$t_{12} = R_1(T_2 - T_1) \quad [6]$$

$$t_{13} = R_1(T_3 - T_1) \quad [7]$$

The vector $x_1$ is the description of point P in the local coordinate system $O_1$. Referring to FIG. 3, the vector $\overline{O_1 P}$ is the difference between the vectors X and $T_1$ in the O coordinate system. In order to arrive at the vector $x_1$, the vector $\overline{O_1 P}$ as described in coordinate system O, needs to be rotated by the rotation $R_1$ in the O coordinate system thus arriving at equation [1]. Equations [2] and [3] follow similar vector algebra deduction and will not be discussed further. Equation [4] describes the rotation $R_2$ as a composite rotation of $R_{12}$ and $R_1$. Similarly Equation [5] describes the rotation $R_3$ as a composite rotation of $R_{13}$ and $R_1$. $t_{12}$ is the vector translation in $O_1$ coordinates from the point $O_1$ to $O_2$. Referring to FIG. 3, the vector $\overline{O_1 O_2}$ is the difference between the vectors $T_2$ and $T_1$ in the O coordinate system. In order to arrive at the vector $t_{12}$ the vector $\overline{O_1 O_2}$ described in coordinate system O, needs to be rotated by the rotation $R_1$ in the O coordinate system thus arriving at equation [6]. Equation [7] follows similar vector algebra deduction and will not be discussed further.

According to equation [1], in order to determine the position of point P in the O coordinate system, we need to solve equation [1] for X:

$$X = R_1^{-1} x_1 + T_1 \quad [8]$$

Where $R_1^{-1}$ is the inverse matrix of the rotation matrix $R_1$.

X can be determined using equation [8] in which $T_1$ is a vector defined by the GPS coordinates of position $O_1$. In one embodiment, $R_1$ may be determined through $t_{12}$ and $t_{13}$. Additionally, in one embodiment $x_1$ may be determined through relative rotations $R_{12}$ and $R_{13}$ as well as translation $t_{12}$, $t_{13}$, and eight matching points or triples in each of three images.

Figure 4:
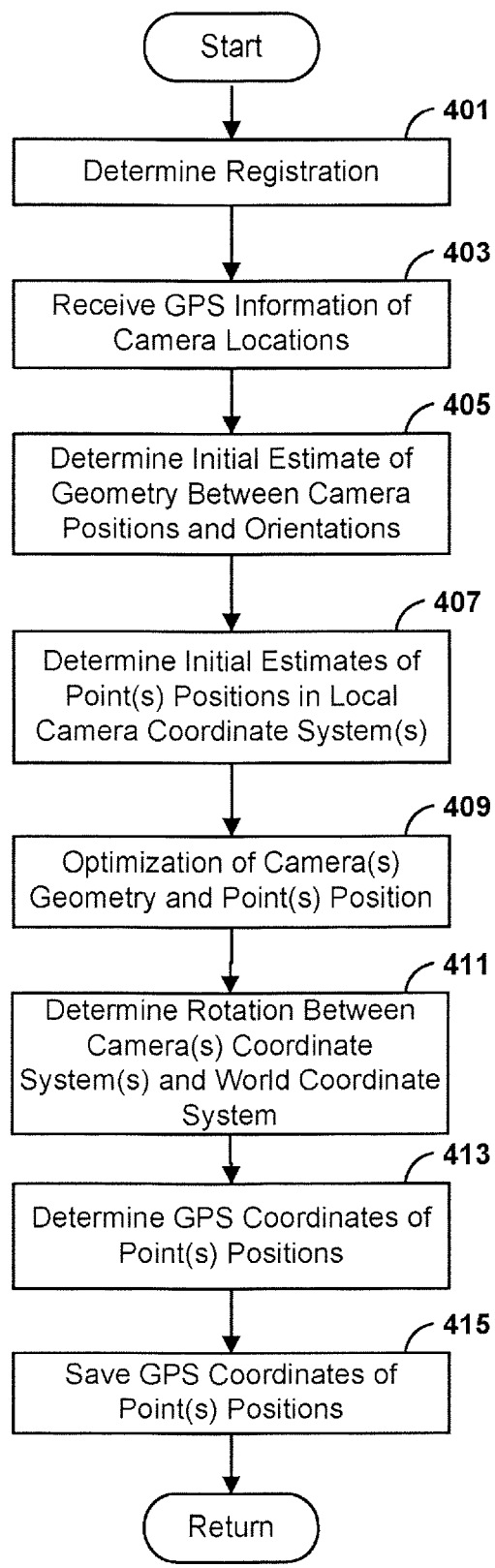
FIG. 4 is a block diagram of a method showing one aspect of the present invention for determining the GPS coordinates of a point(s) positions.

The process described in FIG. 4 determines the GPS coordinates for a position P where there at least three images that contain point P and seven other points in common captured from at least three separate positions. Firstly, the process determines the values for $R_{12}$, $R_{13}$, $t_{12}$, $t_{13}$ using the eight points algorithm. The eight points utilized in this algorithm may or may not include point P. However, the points must exist in each of the images taken at each of a minimum of three camera positions. Next the process determines $R_1$ through relative geometry of three camera positions and orientations as well as three absolute GPS positions of the cameras. Next the process determines the value for $x_1$ in accordance with the camera equation which also utilizes geometrical quantities determined from the relative positions and absolute positions of $O_1$, $O_2$, and $O_3$ and eight matching triples. An iteration process is utilized to increase the accuracy of the value of X using a bundle adjustment technique. Finally, the process saves the GPS coordinates for the value X into a memory.

With reference to FIG. 4, in block 401 the process determines registration. In some embodiments, registration determines the corresponding pixels, matching pixels, matching sub-pixels or sub pixel areas, or corresponding locations in the image plane that may exist in multiple images. In some embodiments, registration is determined using correlation. In other embodiments, registration is determined using matching local neighborhoods. In some embodiments registration is determined by matching one pixel to multiple pixels. In yet other embodiments registration is determined by matching more than one pixel to other multiple pixels. Other methods of performing registration may be used. In other embodiments, registration is determined using the systems and processes described in U.S. Provisional Patent Application No. 61/230,679, titled "3D Matching" and is hereby incorporated by reference. In block 403 the process receives GPS information of at least three camera locations (positions). In some embodiments receiving GPS information comprises receiving GPS coordinates that may be WGS84 or ECEF or derived from WGS84 or ECEF. In other embodiments, receiving GPS information comprises receiving GPS coordinates that may be coordinates that are derived from a relative position (location) of a receiver with respect to transmission towers in a telecommunications system or in a radio frequency based system. In some embodiments, receiving GPS information comprises transferring GPS coordinate information for each of the images captured from a GPS receiver or a camera with built in GPS receiver to a memory. The memory may be located in a general purpose computer or an embedded system. In other embodiments, receiving GPS information comprises transferring GPS coordinate information for each of the images captured from memory to a processor for processing. In other embodiments, receiving GPS information comprises a person entering GPS coordinates by hand into a general purpose computer or embedded system. In block 405 the process determines initial estimates of the geometry between camera positions and orientations. In one embodiment with three camera positions as in FIG. 3, the process determines initial estimates of the geometry between the camera positions and orientations. The geometry between the camera positions and orientations in this embodiment comprises $R_{12}$, $R_{13}$, $t_{12}$, and $t_{13}$. The process determines the initial estimates of $R_{12}$, $R_{13}$, $t_{12}$, and $t_{13}$ using the eight point algorithm. The points used in the eight point algorithm may be eight triples that are determined from the registration process in 401. In another embodiment, the eight point algorithm may use eight pairs in each pair of images that are determined from the registration process in 401.

In one embodiment a processor is configured by program instructions to perform the eight point algorithm in order to determine the initial values for $R_{12}$, $R_{13}$, $t_{12}$, and $t_{13}$. The eight point algorithm is given in "An Invitation to 3-D Vision" by Yi Ma et al (ISBN 0-387-00893-4) Springer-Verlag New York, Inc. 2004 which is hereby incorporated by reference.

In block 407 the process determines the initial estimates of point(s) positions in local camera coordinate(s) systems. In one embodiment a processor executes instructions to determine $x_1$ using the camera equation as follows:

$$x_1 = \lambda_1^P \cdot u_1^P \quad [9]$$

The camera equation is given in "An Invitation to 3-D Vision" by Yi Ma et al (ISBN 0-387-00893-4) Springer-Verlag New York, Inc. 2004 which is hereby incorporated by reference. $u_1^P$ which denotes the point P in camera 1 in its image plane coordinates is obtained by first obtaining point $$\text{triple } U_1^P = \begin{pmatrix} x \\ y \\ 1 \end{pmatrix}_1^P, \quad U_2^P = \begin{pmatrix} x \\ y \\ 1 \end{pmatrix}_2^P, \quad U_3^P = \begin{pmatrix} x \\ y \\ 1 \end{pmatrix}_3^P,$$

where $$\begin{pmatrix} x \\ y \\ 1 \end{pmatrix}_c^P$$

are homogenous image pixel coordinates in pixel units of the point P in camera c. Camera calibration matrix K converts pixel coordinates to image plane coordinates through $u_c^P = K^{-1} U_c^P$, where c is the camera 1, 2, or 3. $u_c^P$ denotes the point P in camera c in its image coordinates. The definition of K and obtaining K is given in "An Invitation to 3-D Vision" by Yi Ma et al (ISBN 0-387-00893-4) Springer-Verlag New York, Inc. 2004 which is hereby incorporated by reference.

Similarly, the camera equation for point P in the other camera coordinates is as follows:

$$x_2 = \lambda_2^P u_2^P = R_{12}(x_1 + t_{12}) = \lambda_1^P R_{12} u_1^P + R_{12} t_{12} \quad [10]$$

$$x_3 = \lambda_3^P u_3^P = R_{13}(x_1 + t_{13}) = \lambda_1^P R_{13} u_1^P + R_{13} t_{13} \quad [11]$$

and more generally, $$\lambda_c^P u_c^P = R_{1c}(x_1 + t_{1c}) = \lambda_1^P R_{1c} u_1^P + R_{1c} t_{1c} \quad [12]$$

The cross product of camera equations [10] and [11] with its corresponding vector representing point P in its image plane coordinates (e.g. $u_2^P$ and $u_3^P$ respectively) provides the following:

$$\lambda_1^P u_2^P \times R_{12} u_1^P + u_2^P \times R_{12} t_{12} = 0 \quad [13]$$

$$\lambda_1^P u_3^P \times R_{12} u_1^P + u_3^P \times R_{13} t_{13} = 0 \quad [14]$$

A processor is configured by program instructions to determine $\lambda_1^P$ by the point depth equation as follows:

$$\frac{1}{\lambda_1^P} = -\frac{\sum_{c=2}^{3} (u_c^P \times R_{1c} t_{1c})^t (u_c^P \times R_{1c} \cdot u_1^P)}{\sum_{c=2}^{3} |u_c^P \times R_{1c} t_{1c}|^2} \quad [15]$$

Equation [15] computes $\lambda_1^P$ where the point P is seen in each of the three images taken from positions $O_1$, $O_2$, and $O_3$ as seen in FIG. 3. In other embodiments, $\lambda_1^P$ may be determined for each point P that is an element of either of the point sets $g_1, g_2, \ldots, g_n$. In this case the point depth equation more generally is described in [16] below:

$$\frac{1}{\lambda_1^P} = -\frac{\sum_{c \in g_1} (u_c^P \times R_{1c} t_{1c})^t (u_c^P \times R_{1c} \cdot u_1^P)}{\sum_{c \in g_1} |u_c^P \times R_{1c} t_{1c}|^2} \quad [16]$$

In block 409 the process optimizes the camera(s) geometry and the point(s) position. In one embodiment the optimization may be minimizing a re-projection error for the solution of $R_{12}$, $R_{13}$, $t_{12}$, and $t_{13}$. A re-projection error at the first iteration is given by a function of differences of the positions of the point P in the image coordinate system of camera 1 when re-projected into the image plane of camera 2 and camera 3 with the prior estimates of the $R_{12}$, $R_{13}$, $t_{12}$, $t_{13}$. In one embodiment the error function for a single point P may be expressed as:

$$E = (re_2(u_1^P) - u_2^P)^2 + (re_3(u_1^P) - u_3^P)^2 \quad [17]$$

where re means re-projection from camera image 1 to camera image 2 or from camera image 1 to camera image 3. And these re-projections are determined using the prior estimates of $R_{12}$, $R_{13}$, $t_{12}$, and $t_{13}$. A general bundle adjustment may be used to achieve each camera's rotation and translation vector relative to camera 1 by minimizing the re-projection error:

$$E = \sum (\tilde{u}_c^P - u_c^P)^2 = \qquad [18]$$

$$\sum_{g_1} (\tilde{u}_c^P - u_c^P)^2 + \sum_{g_2} (\tilde{u}_c^P - u_c^P)^2 + \ldots + \sum_{g_n} (\tilde{u}_c^P - u_c^P)^2$$

where $\tilde{u}_c^P = re_c(u_1^P)$ and c refers to camera 1, 2, 3, . . . and where $g_1, g_2, \ldots, g_n$ are point groups or sets of points with $g_1$ being a point set such that each point in the group can be viewed by camera 1, and the point has corresponding matching points in some other cameras in the group $g_1$. $g_2$ is a point set such that each point in the group can be viewed by camera 2 but not camera 1, and it has corresponding matching points in some other cameras of the group $g_2$, and so on for other point groups. And where p in [18] ranges through all of the points that are matched in corresponding groups $g_1, g_2, \ldots, g_n$. The bundle adjustment described in equation [18] is iterated until the error is reduced to a predetermined threshold or other stopping criteria. Once the bundle adjustment is complete $R_{12}$, $R_{13}$, $t_{12}$, and $t_{13}$ are known.

In block 411 the process determines the rotation between the camera(s) coordinate system(s) and the world coordinate system. In one embodiment determining the rotation between the camera(s) coordinate system(s) and the world coordinate system is determining $R_1$. A processor is configured by program instructions to determine $R_1$ by first determining an axis of rotation of $R_1$ and then determining the amount of rotation around the axis. A vector v may be used to express the direction of the rotational axis as well as the magnitude of the rotation. Whereby the rotational axis of the rotation $R_1$ is the direction of this vector. And the amount of rotation $R_1$ is the magnitude of this vector. We can find this vector v and then use it to determine $R_1$. According to this embodiment we define the following vectors:

$$v_1 = (T_{12} \times t_{12}) \times (T_{12} + t_{12}) \qquad [19]$$

$$v_2 = (T_{13} \times t_{13}) \times (T_{13} + t_{13}) \qquad [20]$$

where $T_{12} = T_2 - T_1$ and $T_{13} = T_3 - T_1$. Equation [19] is a vector $v_1$ which also represents a plane which is normal to the vector $v_1$. Any vector on this plane can be a rotation axis that can rotate $T_{12}$ to $t_{12}$. Similarly, we also have equation [20] which is a vector $v_2$ which also represents a plane which is normal to the vector $v_2$ representing a plane which is a rotation axis that can rotate $T_{13}$ to $t_{13}$. The cross product of these two vectors is the vector v.

$$v = v_1 \times v_2 \qquad [21]$$

v is the rotation axis of our rotation matrix $R_1$. Next we need to determine the amount of rotation or the length of the vector v. The length of vector v is determined by the following equation:

$$\cos(\Theta) = \frac{s_1 \cdot s_2}{|s_1| \cdot |s_2|} \qquad [22]$$

where $$s_1 = T_{13} - \left(\frac{T_{13} \cdot v}{|v|}\right) \frac{v}{|v|} \text{ and}$$

$$s_2 = t_{13} - \left(\frac{t_{13} \cdot v}{|v|}\right) \frac{v}{|v|}.$$

The vectors $s_1$ and $s_2$ form a plane that is normal to the vector v. Therefore, v is the rotation axis of $s_1$ to $s_2$ where the amount of rotation is represented in equation [22]. The amount of the rotation in magnitude is the value of $\Theta$ in equation [22]. The same angle $\Theta$ also represents a rotation between $T_{13}$ to $t_{13}$. We can define the final rotation vector that is equivalent to $$\omega = \frac{v}{|v|} \cdot \Theta \qquad [23]$$

where $$\frac{v}{|v|}$$

is the magnitude of the rotation. We can also express the vector ω as $$\omega = \begin{pmatrix} v_x \\ v_y \\ v_z \end{pmatrix}$$

and define the matrix $$\varpi = \begin{bmatrix} 0 & -v_z & v_y \\ v_z & 0 & -v_x \\ -v_y & v_x & 0 \end{bmatrix}.$$

Next we can determine the matrix $R_1$ by using the Rodrigues formula for a rotation matrix given in "An Invitation to 3-D Vision" by Yi Ma et al (ISBN 0-387-00893-4) Springer-Verlag New York, Inc. 2004 which is hereby incorporated by reference and also expressed in [21] below:

$$R_1 = I + \frac{\varpi}{|\omega|} \cdot \sin(|\omega|) + \frac{\varpi^2}{|\omega|^2} \cdot (1 - \cos(|\omega|)) \qquad [24]$$

where I is the identity matrix.

In block 413 the process determines the GPS coordinates for all points for which correspondences were established through the registration block above. In one embodiment, a processor is instructed to perform the computation defined in equation [8] for each of the image pixels or sub-pixels using the final values determined from the previous process blocks in FIG. 4.

In block 415 the process saves the GPS coordinates of the point(s) positions. In one embodiment the process saves the GPS coordinates to a memory. In another embodiment the process may not necessarily save the GPS coordinates but rather the process simply transmits the GPS coordinates. In another embodiment the process sends the GPS coordinates to a buffer or cache or another computing device.

Figure 5:
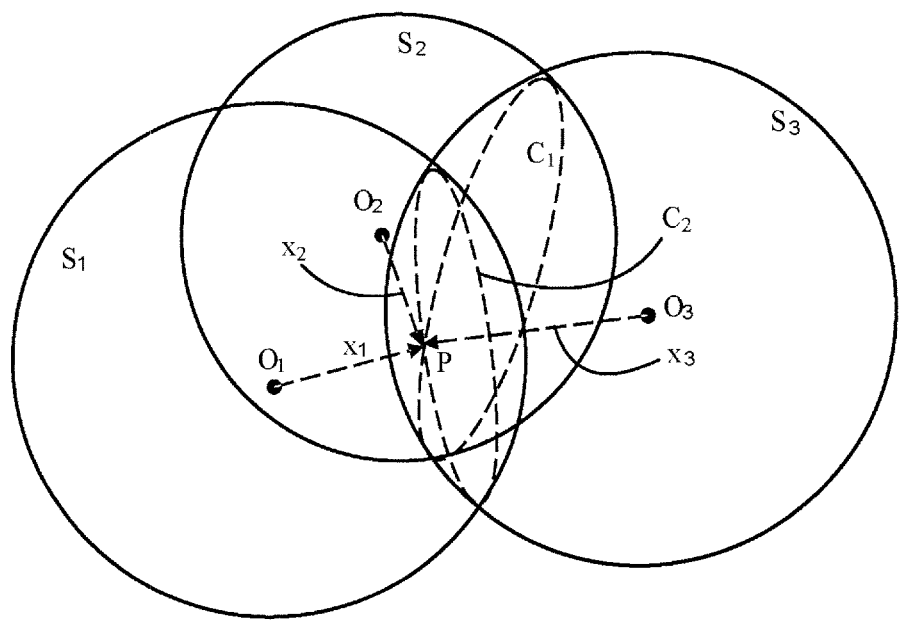
FIG. 5 is a diagram showing an alternative depiction of FIG. 3.

FIG. 5 depicts the same three positions $O_1$, $O_2$, and $O_3$ as in FIG. 3. In one embodiment images are captured at each of these positions. The labels having the same name in both FIG. 3 and FIG. 5 represent the same elements. In FIG. 5 we depict the positions $O_1$, $O_2$, and $O_3$ as centers of spheres $S_1$, $S_2$, and $S_3$ respectively where $S_1$ is a sphere with its center at $O_1$, $S_2$ is a sphere with its center at $O_2$, and $S_3$ is a sphere with its center at $O_3$. Again as with respect to FIG. 3, Camera 1, Camera 2, and Camera 3 refers to cameras at positions $O_1$, $O_2$, and $O_3$ respectively in FIG. 5. In one embodiment these three positions are related to the optical centers of each of the cameras. In one embodiment each of the images captured includes the point in common P whose projection is in the image. The vector X is the position of point P in ECEF, GPS or WGS84 coordinates. The vector X is not shown in FIG. 5 but it is shown in FIG. 3. Point P is a point is 3D space that represents the intersection of the three spheres $S_1$, $S_2$, and $S_3$. Point P may also correspond to a point in the images. In one embodiment the corresponding image projections of the point P is determined through registration as discussed above. In other embodiments, point P may be a single point in either of the set of points $g_1, g_2, \ldots, g_n$, not indicated. As similarly discussed above, the point set $g_1$ is a point set such that each point in the group can be viewed by camera 1, and the point has corresponding matching points in some other cameras in the group $g_1$. The point set $g_2$ is a point set such that each point in the group can be viewed by camera 2 but not camera 1, and it has corresponding matching points in some other cameras of the group $g_2$, and so on for other point groups. The labels having the same name in both FIG. 3 and FIG. 4 represent the same elements. The point O shown in FIG. 3 is not depicted in FIG. 5. The vector X, not shown in FIG. 5, is the position of point P in ECEF, GPS or WGS84 coordinates. The vector $x_1$ is the position of point P in the local coordinate system $O_1$. Also the length of $x_1$ is the radius of the sphere $S_1$. The vector $x_2$ is the position of point P in the local coordinate system $O_2$. Also the length of $x_2$ is the radius of the sphere $S_2$. The vector $x_3$ is the position of point P in the local coordinate system $O_3$. Also the length of $x_3$ is the radius of the sphere $S_3$. The circle $C_1$ depicts the intersection of spheres $S_2$ and $S_3$. The circle $C_2$ depicts the intersection of spheres $S_1$ and $S_3$. The intersection of circles $C_1$ and $C_2$ depicts the point P. Thus, it follows from FIG. 5 that the point P can be determined as a point that belongs to the intersection of the spheres $S_1$, $S_2$, and $S_3$. If the intersection of the spheres $S_1$, $S_2$, and $S_3$ is determined in the world coordinate system therefore point P is determined in the world coordinate system. Trilateration will be used in order to determine the world coordinates of the point P. Trilateration is the process by which the intersection point is determined between three spheres given the coordinates of the centers of the spheres and the radii of each of the spheres.

Figure 6:
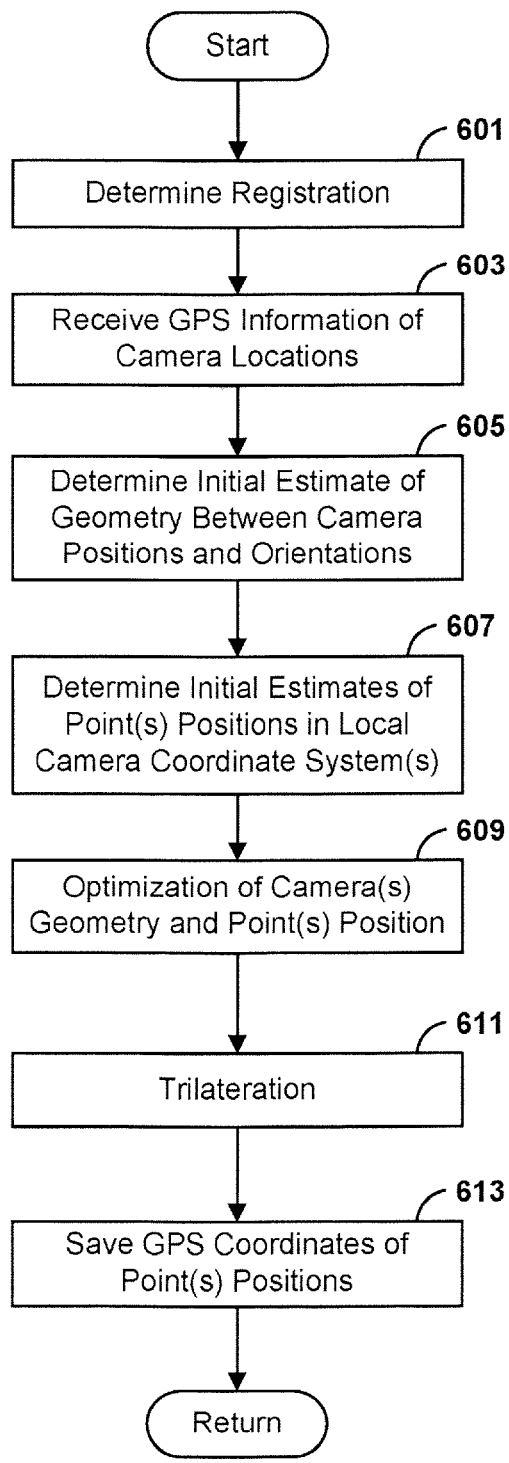
FIG. 6 is a block diagram of a method showing one aspect of the present invention for determining the GPS coordinates of point(s) positions comprising trilateration.

The process described in FIG. 6 determines the GPS coordinates for a position P where there at least three images that contain point P and seven other points in common captured from at least three separate positions. Firstly, the process determines the values for $R_{12}$, $R_{13}$, $t_{12}$, $t_{13}$ using the eight points algorithm. The eight points utilized in this algorithm may or may not include point P. However, the points must exist in each of the images taken at each of a minimum of three camera positions. Next the process determines the values for $x_1$, $x_2$, and $x_3$ in accordance with the camera equations described in equations [9], [10], and [11] which also utilizes geometrical quantities determined from the relative positions and absolute positions of $O_1$, $O_2$, and $O_3$ and eight matching triples. An iteration process is utilized to increase the accuracy of the values $R_{12}$, $R_{13}$, $t_{12}$, $t_{13}$ using a bundle adjustment technique. Next the process of trilateration is performed using the world coordinates for $O_1$, $O_3$, $O_3$ and the lengths of $x_1$, $x_2$, and $x_3$. Finally, the process saves the GPS coordinates for the value X into a memory.

With reference to FIG. 6, in block 601 the process determines registration. Block 601 is the same as block 401 and will not be discussed here further. In block 603 the process receives the GPS coordinates of the three camera locations. Block 603 is the same as block 403 and will not be discussed here further. In block 605 the process determines initial estimates of the geometry between camera positions and orientations. Block 605 is the same as block 405 and will not be discussed here further. In block 607 the process determines the initial estimates of point(s) positions in local camera coordinate(s) systems. Block 607 is the same as block 407 and will not be discussed here further. In block 609 the process optimizes the camera(s) geometry and the point(s) position. Block 609 is the same as block 409 and will not be discussed here further. In block 611 the process uses trilateration to determine the world coordinates of the point(s) positions. In one embodiment a processor is configured by program instructions to determine the position of P (e.g. vector X) by the intersection point of three spheres $S_1$, $S_2$, and $S_3$. The processor may determine the position of P by utilizing as input the lengths of the vectors $x_1$, $x_2$, $x_3$ and the world coordinates of $O_1$, $O_2$, $O_3$. The lengths of vectors $x_1$, $x_2$, and $x_3$ may be determined using equations [9], [10], and [11]. In some embodiments the process may yield more than one solution. In this case the ambiguity may be resolved by utilizing a fourth camera, Camera 4, located at position $O_4$ not included in FIG. 3 or 5. In this embodiment the trilateration process will solve for the intersection of four spheres. In block 613 the process saves the GPS coordinates of the point(s) positions. In one embodiment the process saves the GPS coordinates to a memory.

Figure 7:
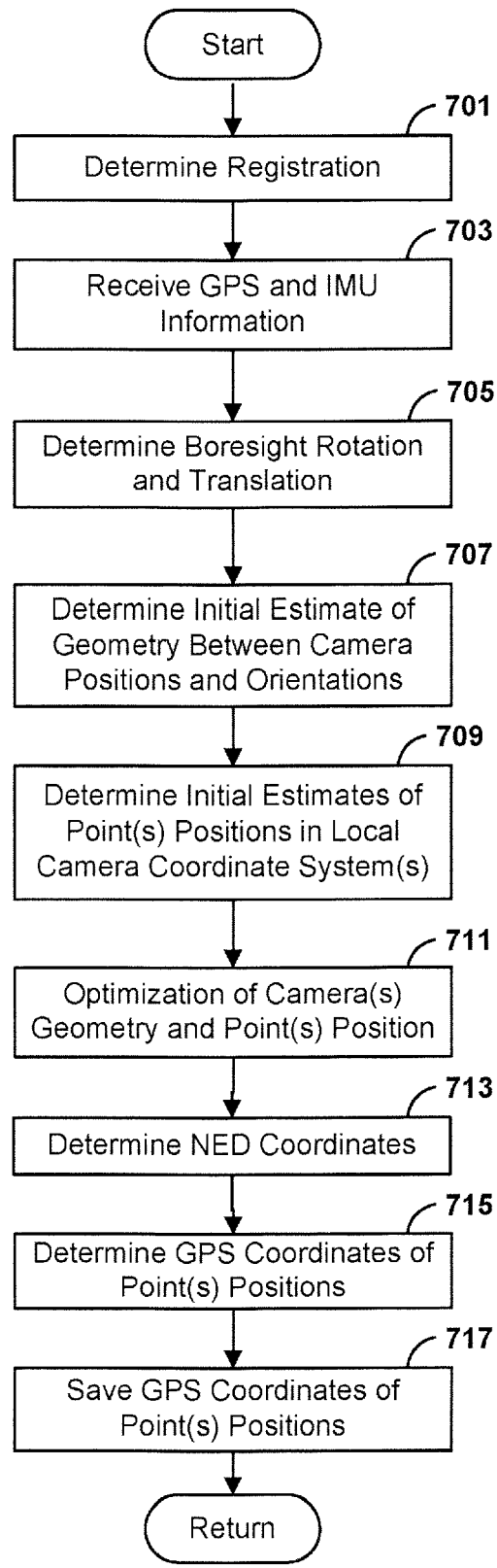
FIG. 7 is a block diagram of a method showing one aspect of the present invention for determining the GPS coordinates of point(s) positions using GPS/IMU.

With reference to FIG. 7, in block 701 the process determines registration. Block 701 is the same as block 401 and will not be discussed here further. In block 703 the process receives GPS coordinates of at least two camera locations and IMU information from at least one of those camera locations. In some embodiments GPS coordinates may be WGS84 or ECEF or derived from WGS84 or ECEF. In other embodiment GPS coordinates may be coordinates that are derived from a relative position of a receiver with respect to transmission towers in a telecommunications system or in a radio frequency based system. In some embodiments, receiving GPS coordinates and IMU information comprises transferring GPS coordinate and IMU information for each of the images captured from a combined GPS receiver and IMU (GPS/IMU) device or a camera with built in GPS and IMU receiver to a memory or a buffer. The memory may be located in a general purpose computer or an embedded system. In some embodiments the GPS/IMU device acquires the GPS information and the IMU information non-synchronously. In this case the GPS and IMU information may be interpolated to achieve approximate synchronization. In other embodiments, receiving GPS coordinates or IMU information comprises transferring GPS coordinate and IMU information for each of the images captured from memory to a processor for processing. In other embodiments, receiving GPS coordinates and IMU information comprises a person entering GPS coordinates and IMU information by hand into a general purpose computer or embedded system. In some embodiments IMU information comprises roll, pitch and yaw information. In some embodiments a GPS device and a IMU device are combined into a single device and referred to in the instant invention as GPS/IMU device. However, in other embodiments a GPS device and a IMU device are separate devices.

In block 705 the process determines the boresight rotation and translation. In some embodiments the boresight rotation may be the relative rotation between the GPS/IMU device coordinate system and the camera coordinate system. Also in some embodiments, the boresight translation may be the translation between the GPS/IMU device coordinate system and the camera coordinate system. Equation [25] below presents the relationship between the coordinates of point P in the GPS/IMU device coordinates and coordinates of the point P in the local camera 1 coordinates $O_1$, using the elements from FIG. 3:

$$X_{gps/IMU} = R_b x_1 + T_b \quad [25]$$

where $R_b$ is the boresight rotational matrix, $T_b$ is the boresight translational vector, $x_1$ is a vector of the position of point P in the local coordinate system $O_1$, and $X_{gps/IMU}$ is the vector of the position of point P in the GPS/IMU coordinate system.

In block 707 the process determines initial estimates of the geometry between camera positions and orientations. Block 707 is the same as block 405 and will not be discussed here further. In block 709 the process determines the initial estimates of point(s) positions in local camera coordinate(s) systems. Block 709 is the same as block 407 however, since this embodiment at a minimum requires only two cameras for example Camera 1 and Camera 2, equation [15], which determines $\lambda_1^P$, is determined for c=2 (two cameras) only. Also $x_1$ is determined by using equation [9]. In block 711 the process optimizes the camera(s) geometry and the point(s) position. Block 711 is the same as block 409 and will not be discussed here further. In block 713 the process determines the local north, east, down (NED) coordinates. In one embodiment a processor is configured by program instructions to perform equation [26] below where the NED coordinates are determined.

$$X_{NED} = R_y R_p R_r X_{gps/IMU} \quad [26]$$

where $X_{NED}$ is the vector of the position of point P in the local NED coordinate system, $R_y$ is a yaw rotation matrix determined from the GPS/IMU device, $R_p$ is a pitch rotation matrix determined from the GPS/IMU device, R is a roll rotation matrix determined from the GPS/IMU device, and $X_{gps/IMU}$ is the vector of the position of point P in the GPS/IMU coordinate system. In block 715 the process determines the GPS coordinates for all point(s) positions for which correspondences were established through the registration block above in 701. In one embodiment a processor is configured by program instructions to determine GPS coordinates using equation [27] below:

$$X_{ECEF} = R_{NED} X_{NED} + T_{ECEF} \quad [27]$$

where $X_{ECEF}$ is the vector of the position of point P in ECEF world coordinate system, $R_{NED}$ is the rotation matrix for rotating between the NED coordinate system to the ECEF coordinate system, $T_{ECEF}$ is the translation vector for translating between the NED coordinate system to the ECEF coordinate system. $R_{NED}$ and $T_{ECEF}$ are determined from the GPS data provided by the GPS/IMU device. In block 717 the process saves the GPS coordinates of the point(s) positions. In one embodiment the process saves the GPS coordinates to a memory. In another embodiment the process may not necessarily save the GPS coordinates but rather the process simply transmits the GPS coordinates. In another embodiment the process sends the GPS coordinates to a buffer or cache or another computing device.

Sometimes a GPS/IMU device or standalone GPS device is not available. In this instance we utilize ground truth points. Ground truth points are observed points in an image that have known UPS coordinates. When using the process depicted in FIG. 7, the IMU information is derived from the ground truth points and their related geometry as is known in the art. When using the process depicted in FIG. 4, the GPS information is derived from the ground truth points as is known in the art.

There are situations where an observation or surveillance camera is used to monitor an area. However, the GPS coordinates of the observation/surveillance camera is not known. Yet we still want the GPS coordinates of the pixels and objects being observed in the camera. In order to obtain the GPS coordinates of various objects being viewed by the observation/surveillance camera we first determine GPS coordinates and the 3-D model of the 3-D scene that is being observed by the surveillance camera, using another camera(s) whose GPS location is known. By methods known in the art, calculate projection map from the observation/surveillance camera to the 3-D model determined as above. Calculate intersection of the projection ray through each pixel of the observation/surveillance camera with the 3-D model. Assign the GPS of the intersection point to the corresponding pixel of the observation/surveillance camera. In this method, it is assumed that the pixels observations correspond to objects located against the GPS referenced 3-D model. The applications of this process may include finding GPS of subjects (people), objects (vehicles), including the real-time observations from border security cameras, football stadium security cameras and public places security cameras.

The invention claimed is:

1. A system for determining world coordinates of a point in 3D space whose projection is common to at least three images captured by one or more image capture devices from at least three separate locations, comprising:
   memory for storing program instructions;
   at least one processor in communication with the memory wherein the processor is configured by the program instructions to:
      receive world coordinates for each of the at least three separate locations;
      determine translational and rotational geometry of each of the one or more image capture devices with respect to each other based on the at least three images;
      determine local geometry of the point in 3D space; and
      determine world coordinates of the point in 3D space using trilateration based on the world coordinates for each of the at least three separate locations and the local geometry of the point in 3D space, and translational and rotational geometry of each of the one or more image capture devices with respect to each other.

2. The system of claim 1 wherein the world coordinates for each of the at least three separate locations are determined based upon world coordinates of ground truth points.

3. The system of claim 1 wherein determining world coordinates of the point further comprises determining translational and rotational geometry of at least one of the one or more image capture devices with respect to the world coordinate system.

4. The system of claim 3 wherein determining translational and rotational geometry of at least one of the one or more image capture devices with respect to the world coordinate system comprises computing a rotation matrix for the at least one of the one or more image capture devices with respect to the world coordinate system.

* * * * *